May 3, 1927.

H. MOELLER 1,626,622

INDUCTION MOTOR

Filed June 1, 1925

WITNESSES:
R. S. Harrison
S. M. Pincles

INVENTOR
Heinrich Moeller
BY
Wesley S. Carr
ATTORNEY

Patented May 3, 1927.

1,626,622

UNITED STATES PATENT OFFICE.

HEINRICH MOELLER, OF COLOGNE BAYENTHAL, GERMANY, ASSIGNOR TO WESTINGHOUSE ELECTRIC & MANUFACTURING COMPANY, A CORPORATION OF PENNSYLVANIA.

INDUCTION MOTOR.

Application filed June 1, 1925, Serial No. 33,896, and in Germany June 7, 1924.

My invention relates to induction motors and it has particular relation to motors of this type having automatic means for controlling the impedance in the secondary winding.

The principal object of my invention is to provide an induction motor which will develop a high starting torque with minimum current and will have good speed regulation under normal operating conditions, while avoiding circuit-interrupting switches, and the like, for controlling the resistance in the secondary of the motor.

My invention will best be understood by reference to the accompanying drawing, in which—

Figure 1:
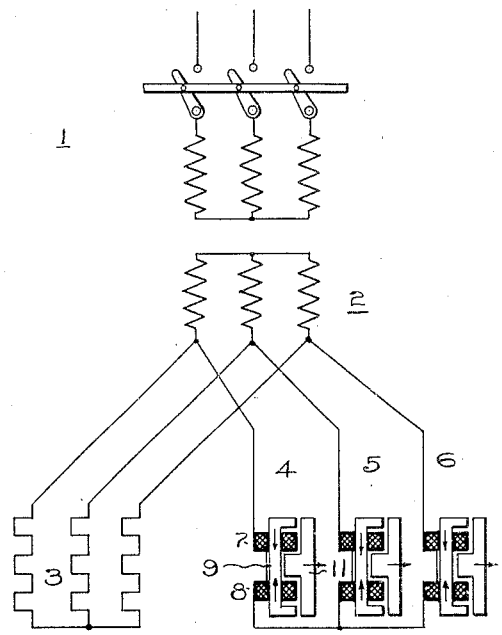
Figure 2:
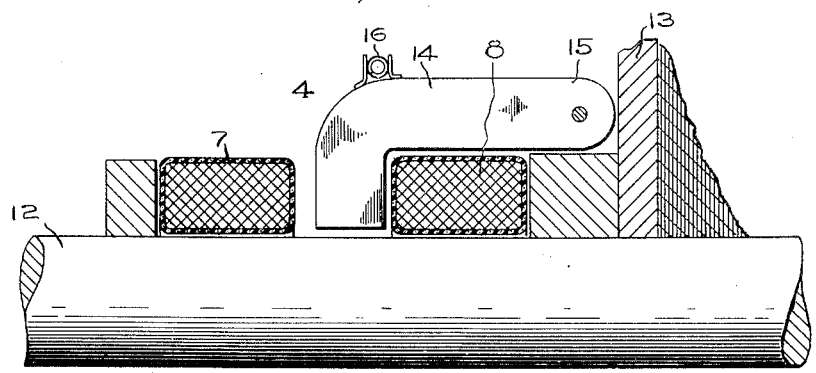

Fig. 1 is a diagrammatic view of the circuit connections of a motor embodying my invention, and Fig. 2 is a sectional view of a portion of the rotor of the induction motor shown in Fig. 1.

Induction motors may be started by close-circuiting the secondary winding of the motor over a reactor or choke coil offering a relatively high impedance to the currents induced in the secondary winding and thereby reducing the starting current taken from the line. As the motor speed increases, the frequency of the current induced in the secondary by the slip of the rotor decreases, and the reactor or choke coil winding offers a relatively low impedance to the secondary currents, thus giving a desirable constant speed range under normal running conditions. Such an arrangement has several drawbacks. First, the high reactance of the secondary winding causes a relatively great phase displacement of the currents induced therein and results in a greatly reduced starting torque. Second, such motors possess a considerable inductance, even at high speeds, resulting in a motor which has a poor power factor that is even worse than the already poor power factor of ordinary induction motors.

My invention avoids the objections stated above, and produces an induction motor giving a high power factor throughout the entire speed range, with good starting torque at low starting currents, by combining a resistor, which is connected to the secondary winding of the induction motor, with a specially arranged reactor or choke coil capable of changing its inductance from a very high value at starting to a relatively negligible value under normal operation.

Referring to the accompanying drawing, an induction motor 1 has a polyphase wound secondary winding 2 which is permanently close-circuited through a polyphase resistor 3 which is so proportioned as to cause the motor to develop a relatively high starting torque with relatively small starting currents drawn from the line. In parallel to the resistors are connected three reactors or choke coils 4, 5 and 6, offering, to the currents induced in the secondary winding 2 of the induction motor, a parallel close-circuited path independent of the path through the resistor 3. The choke coils and the resistors are suitably mounted upon the shaft of the motor constituting, together with the armature of the motor, a single unit which is suitably housed in the interior of the motor.

An essential feature of my invention is the arrangement of the choke coils whereby high starting torque and good constant-speed characteristics are obtained without sacrificing the power factor of the motor and without introducing switches for interrupting the relatively heavy currents in the secondary winding 2.

To this end, the reactors are so arranged as to provide a very high inductance, and consequently a very high impedance, when the motor is at standstill. As the motor speed increases, the magnetic circuit of the choke coils is changed by means of a centrifugally operated device, so as to make the inductance of the coils negligible and to present a low-reactance, low-resistance close-circuited path for the currents induced in the secondary winding 2 of the induction motor.

As shown in the drawing, each of the choke coils which are connected in each of the phases of the secondary winding 2 comprises two coil-halves 7 and 8 so wound on a common core as to produce opposing magnetic fluxes in the core. A movable magnetic bridge or armature 11 is combined with the coils 7 and 8 and the core 9 of each choke coil to provide two independent paths for the fluxes induced by each coil-half 7 and 8, respectively. When the motor is at rest, the magnetic bridge 11 is in a position such as that in which it is shown in the drawing, permitting the full development of the flux in each coil-half, each choke coil offering a very high impedance to the flow of alternating currents induced in the secondary winding 2, and forcing substantially the entire current into the resistor 3. This permits the starting of the motor with relatively large torque and low starting current.

The magnetic bridges or armatures 11 are arranged to move outwardly under the influence of the centrifugal force, which comes into action as the motor speed increases. When the armatures are in their outer positions, the fluxes induced by the coil-halves must take a common path and counteract each other, producing the effect of a non-inductive winding. Under the latter condition, the choke coils 4, 5 and 6 have a relatively negligible inductance and offer a very low impedance to currents induced in the secondary winding 2. The motor will now operate at approximately constant speed over a very wide range of loads.

Fig. 2 shows schematically how the choke coils 4, 5 and 6 may be arranged upon a shaft 12 of an induction motor. The shaft carries the induction-motor armature 13 with the choke coil halves 7 and 8 surrounding the shaft, only one pair being shown, for the sake of simplicity. The choke-coil halves are so connected that the current therethrough produces fluxes in opposite directions. One of the choke-coil halves 8 is surrounded by an iron armature 14 which may be pivoted at 15 to move outwardly, under the action of centrifugal force against the action of a garter spring 16. At low speeds, the flux in each coil-half may develop independently, thus producing a high inductance. At high speeds, when the armature 14 has moved outwardly, the flux induced by the two bucking coils is small, giving a very low inductance, as explained hereinabove.

The resistors and the choke coils may be conveniently mounted near the armature in the space which is normally occupied by the slip rings.

I claim as my invention:

1. In an induction motor, the combination with a secondary winding, of a speed-responsive reactance device for close-circuiting said winding, said device comprising a plurality of windings connected to oppose each other and speed-responsive means for causing the flux induced by said windings to develop independently at starting and to oppose each other when running.

2. The combination with an induction motor, having a primary winding and a rotor having a secondary winding, of an automatic starting device mounted upon said rotor, said device comprising a resistor permanently close-circuiting said secondary winding and a reactor connected in parallel to said resistor, said reactor comprising two serially connected coils opposing each other, an iron core common to said coils and a movable magnetic member operating, at times, to provide individual closed magnetic circuits for each coil and operating, at other times, to cause said coils to have a single common magnetic circuit.

3. The combination with an induction motor of the wound-rotor type, of an automatically variable secondary short-circuiting device comprising a polyphase resistor permanently connected across the secondary winding of the induction motor, and a polyphase, low-resistance reactance device paralleling the resistor and comprising opposing coils mounted on a common core and centrifugally actuated armature means for providing individual flux paths for the opposing coils during low-speed operation.

In testimony whereof, I have hereunto subscribed my name this 15th day of May, 1925.

HEINRICH MOELLER.